(12) United States Patent
Elyada

(10) Patent No.: US 8,332,393 B2
(45) Date of Patent: Dec. 11, 2012

(54) SEARCH SESSION WITH REFINEMENT

(75) Inventor: Oded Elyada, Tel Aviv (IL)

(73) Assignee: Microsoft Corporation, Redmond, WA (US)

( * ) Notice: Subject to any disclaimer, the term of this patent is extended or adjusted under 35 U.S.C. 154(b) by 177 days.

(21) Appl. No.: 12/907,193

(22) Filed: Oct. 19, 2010

(65) Prior Publication Data

US 2012/0095980 A1    Apr. 19, 2012

(51) Int. Cl.
*G06F 7/00*    (2006.01)
(52) U.S. Cl. ...................................................... 707/722
(58) Field of Classification Search .................... 707/722
See application file for complete search history.

(56) References Cited

U.S. PATENT DOCUMENTS

| | | | |
|---|---|---|---|
| 2004/0249790 A1 * | 12/2004 | Komamura | 707/3 |
| 2006/0248078 A1 | 11/2006 | Gross et al. | |
| 2007/0174319 A1 * | 7/2007 | Chou | 707/101 |
| 2009/0063475 A1 | 3/2009 | Pendse | |
| 2010/0153384 A1 | 6/2010 | Van Zwol | |

OTHER PUBLICATIONS

"Google Launches New Search Interface: Google Instant", Retrieved at <<http://blog.hubspot.com/blog/tabid/6307/bid/6574/Google-Launches-New-Search-Interface-Google-Instant.aspx>>, Retrieved Date: Sep. 28, 2010, pp. 6.
"scitopia.org", Retrieved at <<http://www.scitopia.org/scitopia/help.html?helpId=search>>, Retrieved Date: Sep. 28, 2010, pp. 4.
Sadeh, Tamar., "Multiple Dimensions of Search Results", Retrieved at <<http://www.exlibrisgroup.com/files/Publications/MultipleDimensionsOfSearchResults.pdf>>, Analogous Spaces Interdisciplinary Conference, May 15-17, 2008, pp. 13.
Zhuang, et al., "Exploiting Semantic Query Context to Improve Search Ranking", Retrieved at <<http://research.microsoft.com/en-us/people/silviu/ieee-icsc08.pdf>>, Proceedings of the IEEE International Conference on Semantic Computing, 2008, pp. 1-8.
"Modify A Search", Retrieved at <<http://content.thoughtequity.com/preview/marketing_download/Links/TEM_Modify_Search.pdf>>, 2010, pp. 1.
Andras, Rung., "Principles of Effective Search in E-Commerce Design", Retrieved at <<http://www.smashingmagazine.com/2009/12/08/principles-of-effective-e-commerce-search/>>, Dec. 8, 2009, pp. 18.

* cited by examiner

*Primary Examiner* — Apu Mofiz
*Assistant Examiner* — Ajith Jacob

(57) ABSTRACT

A search system may use a stateful session that suggests new keywords for refining a search with each iteration of a search sequence. The keywords may be derived from a set of previous search results, or may be identified from a taxonomy of terms. A user may be able to select the keywords to include or exclude from a user interface to further refine the search. In some embodiments, the user interface may also include various metadata parameters to include or exclude. The system may use one or more conventional query-based search engines and may be implemented as a client application, intermediate service, or as part of a search engine.

20 Claims, 3 Drawing Sheets

SEARCH SESSION WITH REFINEMENT

BACKGROUND

Common query-based search systems are generally stateless. In a typical use scenario, a user may use a web search engine by transmitting one or more keywords to the search engine. The search engine may respond with a set of web pages that contain the keywords. The user may review summaries of the web pages only to find out that the search may be too broad and the user may add more keywords, which will produce another set of results. This process may iterate until the user finds some results or until the user gives up.

SUMMARY

A search system may use a stateful session that suggests new keywords for refining a search with each iteration of a search sequence. The keywords may be derived from a set of previous search results. A user may be able to select the keywords to include or exclude from a user interface to further refine the search. In some embodiments, the user interface may also include various metadata parameters to include or exclude. The system may use one or more conventional query-based search engines and may be implemented as a client application, intermediate service, or as part of a search engine.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
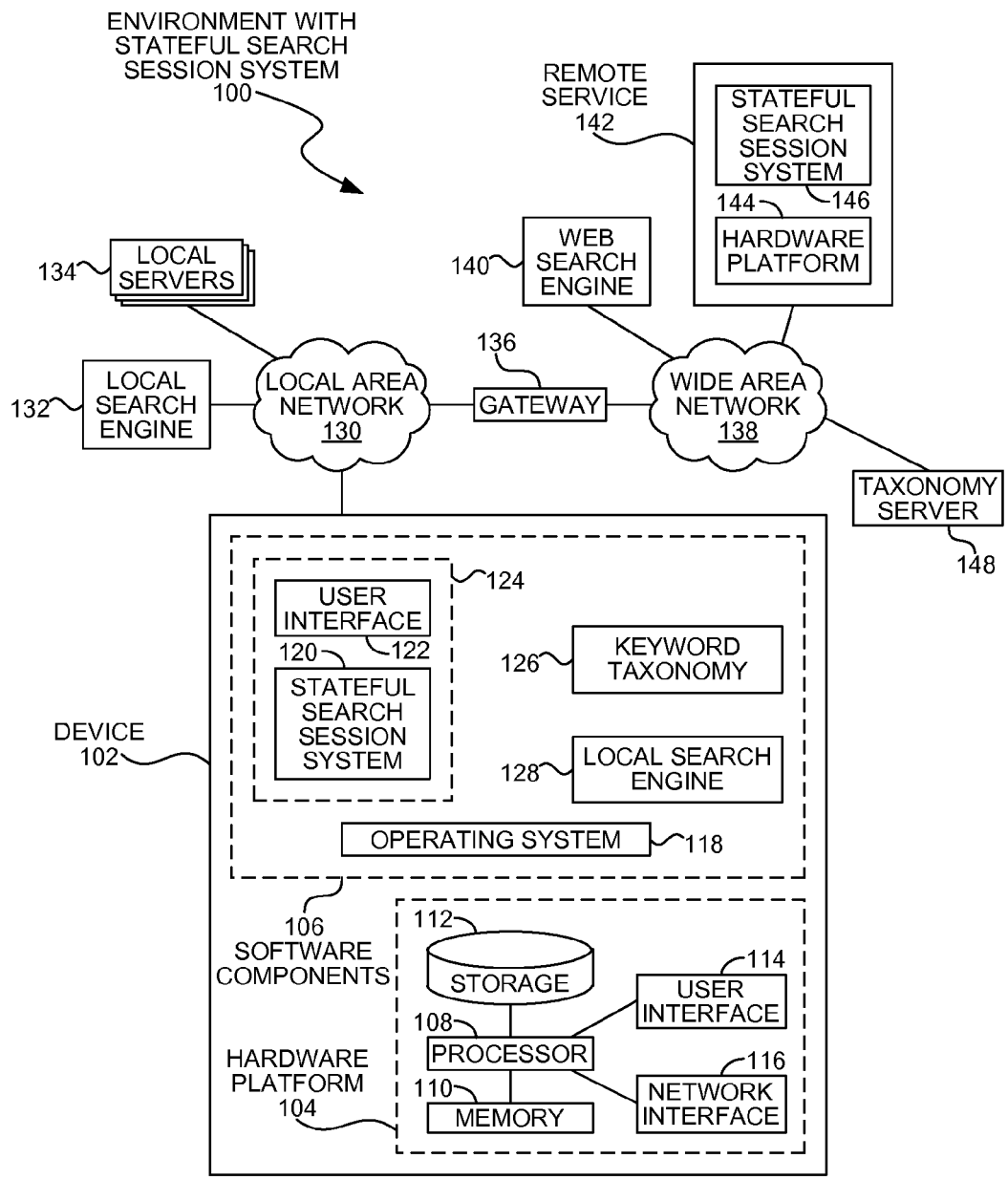
FIG. 1 is a diagram illustration of an embodiment showing an environment in which a search system may operate.

A search system may create a stateful session for a search which may progress through one or more iterations. Within each iteration, the results of a previous keyword search may be presented to a user, and additional keywords related to the previous search may also be presented to the user. The user may be able to select one or more of the additional keywords to further refine the search.

The additional keywords may be derived from various sources for determining keywords. In some embodiments, the additional keywords may be derived or supplemented from a taxonomy of keywords. In other embodiments, the additional keywords may be derived from the previous search results by analyzing the search results to identify possible keywords, either from summaries of the individual search results or from direct analysis of the search results in some cases.

The search system may be implemented in several different architectures. In one architecture, an application may execute on a client computer system and the search session state may be maintained on the client computer system. In another architecture, an intermediary service may maintain the search session state and may execute searches against a stateless search engine. Such an intermediary service may be a web service that may be accessed using a web browser. Still another architecture may be incorporate stateful search sessions into a search engine.

The stateful search system may use several different types of search engines and may aggregate search results from multiple search engines. For example, the search system may use local search engines, search engines within a local area network or other protected computer network, web search engines, database search engines, or other types of search engines. In many cases, such search engines may be stateless search engines that may reply to a keyword query with results for a domain for the particular search engine.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing an environment with a stateful search session system. Embodiment 100 is a simplified example of a hardware and software environment in which several different embodiments of a stateful search session system may operate.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

A stateful search session system may create a session for performing a search, where the session's state may be maintained throughout successive search operations. The state may include a current set of keywords as well as suggested or related keywords from which a user may select to refine the search.

The suggested keywords may be derived at least in part from the current search results. In some embodiments, the search results may be provided with summaries from which keywords may be derived. In other embodiments, keywords may be derived by loading or examining each of the search results. In such embodiments, the suggested keywords may be derived from the actual content and metadata of the items retrieved from the search results.

In some embodiments, the suggested keywords may be derived at least in part from analyzing a predefined taxonomy of keywords. The taxonomy may be a database that may be defined prior to the search and may contain related keywords. In some embodiments, various keywords may be defined with a numerical weighting that defines the strength or weakness of a similarity between the keywords.

In some embodiments, a taxonomy may be used as the sole provider of suggested keywords. In other embodiments, the taxonomy may be used to supplement keywords derived from analyzing results contents. Such embodiments, the taxonomy may be used to classify or group keywords, for example, as well as to provide additional keywords in some situations.

The additional keywords may be presented to a user so that the user may choose to include one or more of the keywords in a subsequent search iteration. In some embodiments, the additional keywords may be presented so that the user may include or exclude certain keyword. When a keyword may be included, results that match the keyword may be included in the search results. When a keyword may be excluded, results that match the keyword may be removed from the search results. In some embodiments, the included or excluded terms may be used to rank the results using a relevance analysis.

Various metadata may also be used to refine searches. The metadata may include classifications or other information that may be used to refine the search. The classifications may define items such as a results type, which may be a web page, word processing document, spreadsheet, blog post, news item, social network results, or any other type of document. The metadata may include other information, such as a results source, timestamp or other date and time information, or any other metadata information.

The metadata items may be presented along with additional keywords in a user interface to assist the user in refining the search results. The various keywords and metadata may constitute a state of the search, and the state may be preserved and updated throughout the search session.

The stateful search session system may be an efficient system for browsing and refining search results. In a conventional stateless search system, a user may come up with keywords for searching, then manually scan the results to find results that look like they may match. If the results are not focused enough, the user may perform another search with additional keywords to further limit the search scope. Many stateless search systems may present the user's previous keywords along with the search results, but do not maintain any other state information.

When viewing results from a stateless search engine, a user may find it difficult to find a word that may better describe the user's desired topic. This situation can be very frustrating for searches where the user can only find one way to describe the search, where the user is searching in a language in which the user may not be fluent, or other cases where the user may not be able to recall any better terminology.

A conventional stateless search engine may provide a large number of results, but when a user cannot find a good additional search term, a subsequent search with a non-optimal keyword may exclude many good results.

The stateful search session system may group the search results by additional keywords, where the additional keywords may be derived from the results themselves. The grouping may allow a user to progress through a search by identifying groups to include and, in some embodiments, groups to exclude from the search session.

The user experience of the stateful search session system may be a dynamic and interactive experience, especially when compared to a conventional stateless search engine. A conventional stateless search engine may provide a set of results which a user may scroll and scan.

The stateful search session system may present a set of search results that a user may scan on a user interface, but then the stateful search session system may analyze those results and begin finding keywords that may be used to group the search results based on additional keywords derived from the search results. The additional keywords may be added to the user interface over time as the additional keywords are uncovered. In some embodiments, the additional keywords may be added dynamically to the user interface while the user interacts with the search results.

The stateful search session system may be implemented on several different architectures. In one architecture, a stateful search session system may be incorporated into a conventional stateless search engine. In such an architecture, the search engine may produce HTTP documents or web pages that may be displayed on a user's client device using a browser.

In another architecture, a stateful search session system may be a client application or other executable that executes on a user's device, such as a personal computer or wireless handset, and provides a dynamic, interactive session while querying a search engine over a network connection. Such an architecture may be useful in situations where the user's device may have enough network bandwidth and computer processing capabilities to extract keywords from the search results. An example may be a conventional personal computer connected to a high speed network connection.

In a third architecture, the stateful search session system may be a website or other intermediate service that may be accessed from a client device using a browser, application, or other interface, but a bulk of the processing may be performed by the intermediate service. Such an architecture may be useful for a device that may have limited processing and network capabilities, such as a mobile telephone handset for example.

Embodiment 100 illustrates a device 102 that may have a stateful search session system that may interact with various search engines to provide a dynamic, interactive search experience to a user of the device 102.

The device 102 is illustrated having hardware components 104 and software components 106. The device 102 as illustrated represents a conventional computing device, although other embodiments may have different configurations, architectures, or components.

The controller device 102 may be a server computer, desktop computer, or comparable device. In some embodiments, the controller device 102 may be a laptop computer, netbook computer, tablet or slate computer, wireless handset, cellular telephone, or any other type of computing device.

The hardware components 104 may include a processor 108, random access memory 110, and nonvolatile storage 112. The hardware components 104 may also include a user interface 114 and network interface 116. The processor 108 may be made up of several processors or processor cores in some embodiments. The random access memory 110 may be memory that may be readily accessible to and addressable by the processor 108. The nonvolatile storage 112 may be storage that persists after the device 102 is shut down. The nonvolatile storage 112 may be any type of storage device, including hard disk, solid state memory devices, magnetic tape, optical storage, or other type of storage. The nonvolatile storage 112 may be read only or read/write capable.

The user interface 114 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 116 may be any type of connection to another computer. In many embodiments, the network interface 116 may be a wired Ethernet connection. Other embodiments may include wired or wireless connections over various communication protocols.

The software components 106 may include an operating system 118 on which various applications and services may operate. An operating system may provide an abstraction layer between executing routines and the hardware components 104, and may include various routines and functions that communicate directly with various hardware components.

The hardware architecture illustrated for device 102 may represent a conventional personal computer or server computer that may be constructed from various discrete hardware components. Such an embodiment is for illustration only. In other embodiments, some or all of the various illustrated hardware and software components may be implemented in gate arrays or other hardware logic. Such embodiments may be useful in small handheld devices, such as cellular telephone embodiments, as well as compact, low power high performance computing devices such as datacenter computers.

A stateful search session system 120 may execute on the hardware platform 104 in the embodiment of device 102. The stateful search session system 120 may query various search engines, present the results, analyze the results, and present keywords derived from the results. The stateful search session system 120 may create a user interface 122 that may be displayed on the hardware user interface 114.

In some embodiments, the stateful search session system 120 may be embodied in an executable within a web browser. Such an embodiment may be illustrated by the dashed line forming the box 124. In such an embodiment, some or all of the operations of the stateful search session system 120 may be performed by a script or other executable that may be executed on the device 102. In some embodiments, some of the processing of the stateful search session system 120 may be performed by another device, such as a remote server or cloud based service.

Some embodiments may include a predefined keyword taxonomy 126. The keyword taxonomy 126 may store various keywords and relationships between the keywords. The keyword taxonomy 126 may be used to supplement analyses of additional keywords.

In some embodiments, the keyword taxonomy 126 may include keywords and relationships between the keywords. Some embodiments may express the relationships in numerical terms and the expression may indicate the similarities or differences between the keywords. In some embodiments, the keyword taxonomy 126 may be used to identify closely related additional keywords as well as distantly related or unrelated keywords. Such an analysis may be cluster the additional keywords into groups so that a user may select one or more groups of additional keywords as opposed to merely selecting one additional keyword at a time.

The stateful search session system 120 may use various search engines, including a local search engine 128. The local search engine 128 may be capable of searching a file system or other database that may be located on the device 102. In some embodiments, a stateful search session system 120 may be capable of using multiple search engines.

In some embodiments, the stateful search session system 120 may be capable of using a local search engine 132. The local search engine 132 may be connected to the device 102 through a local area network 130, and may provide search services across one or more local servers 134.

Similarly, some embodiments may be capable of using a web search engine 140, which may be accessed through the local area network 130, a gateway 136, and a wide area network 138. The wide area network 138 may include the Internet in some cases. The web search engine 140 may index various web pages available across the wide area network 138.

The various search engines may provide search services by indexing various data sources and creating a searchable database. Queries to the search engine may be processed by querying the searchable database and generating search results.

Some search engines may be a service or query that may be performed against a database system. For example, a search engine service may be provided by an electronic mail system or messaging system. The search engine service may accept a search query and execute the search query against a database of messages to generate search results that may be messages or portions of messages that contain various keywords or other searchable characteristics.

Some embodiments may provide a stateful search session system 146 through a remote service 142. In such an embodiment, the stateful search session system 146 may execute on a hardware platform 144 that may be accessed over the wide area network 138. In some such embodiments, the hardware platform 144 may be a server located on the Internet, a cloud service, or other type of platform. In some embodiments, the stateful search session system 146 may be deployed with a load balancing system that may distribute communications with the stateful search session system 146 to various instances executing on the hardware platform 144.

In some cases, a taxonomy server 148 may provide similar taxonomy services as the keyword taxonomy 126 located on the device 102. The taxonomy server 148 may be a remote server that may receive taxonomy queries and respond with an appropriate response. In some embodiments, the taxonomy query may be a single keyword and a response may be a list of similar keywords. In other embodiments, the taxonomy query may be a set of additional keywords and the response may be the relationships between each of the various keywords. Some embodiments may also provide a grouping of additional keywords.

Figure 2:
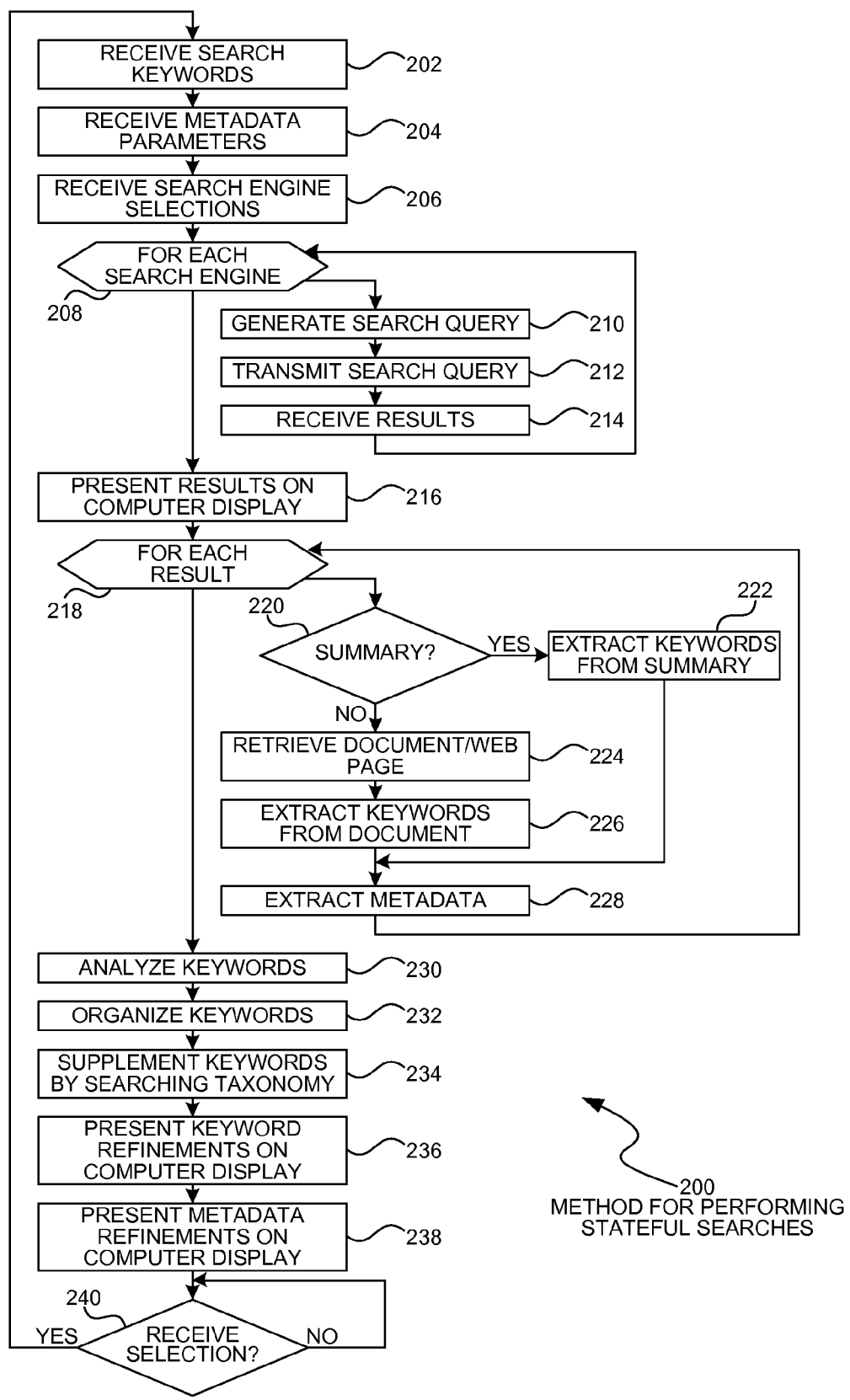
FIG. 2 is a flowchart illustration of an embodiment showing a method for performing stateful searches.

FIG. 2 is a flowchart illustration of an embodiment 200 showing a method for performing stateful searches. The process of embodiment 200 is a simplified example of the operations that may be performed in delivering an interactive stateful search session.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates one simplified example of steps that may be performed to deliver a stateful search engine experience. Embodiment 200 illustrates an embodiment that may be performed by a local application, a web service, or other architecture.

In block 202, search keywords may be received. In a simple embodiment, a user may be presented with a user interface through which the user may type certain keywords. Other embodiments may allow a user to select keywords through some other mechanism.

An initial set of keywords may be received in block 202 to start a search session. As the search session progresses, additional keywords may be added to the search query.

Metadata parameters may be received in block 204. The metadata parameters may include any type of metadata selection criteria that may be used in a search. For example, some search systems may produce results that contain several different types of results, such as word processing documents, web pages, spreadsheets, or other result types. The search system may allow a user to include or exclude certain types from the search. In another example, the metadata parameters may include a date and time range, author, or other parameters that may be used to limit the results returned.

A search engine selection may be received in block 206. Some embodiments may allow a user to select one or more different search engines. Other embodiments may use only a single search engine and therefore the search engine may be implied.

For each of the selected search engines in block 208, a search query may be generated in block 210, transmitted to the search engine in block 212, and results received in block 214. The search query of block 210 may be generated from the search keywords and metadata received in blocks 202 and 204, respectively. When multiple search engines are used, each search engine may have a different format or mechanism for receiving a query and transmitting results. In such embodiments, the queries in block 210 may be different to accommodate the different search engines.

After processing the various search engines, the results may be presented on a computer display in block 216. At this point, a user may be able to browse and select the results.

While the user may be able to browse the results, the results may be analyzed to generate additional keywords and metadata options. For each result in block 218, if a summary of the results exists in block 220, keywords may be extracted from the summary in block 222. If the summary does not exist in block 220, the resulting document or web page may be retrieved in block 224 and keywords may be extracted from the result document in block 226. In block 228, any metadata parameters may be extracted from the result.

After receiving keywords from the results in block 218, the keywords may be analyzed in block 230 and organized in block 232. In some embodiments, the keywords may be supplemented by searching a predefined taxonomy in block 234.

The keyword refinements may be presented on the computer display in block 236, and any metadata refinements may be presented in block 238. When a user makes a keyword and/or metadata selection in block 240, the process may return to block 202 to be performed with any updated keywords and metadata selections.

Embodiment 200 illustrates an example embodiment where all of the search results may be analyzed to identify keywords. In some embodiments, a subset of the results may be analyzed. For example, some embodiments may analyze merely the first ten or first hundred results received. Other embodiments may analyze batches of results at a time, such as analyzing fifty results at a time and supplementing the previous keyword and metadata analyses with each successive analysis.

The keywords extracted from the results may be analyzed in block 230 to remove duplicate or similar keywords. In block 232, the keywords may be grouped, sorted, or otherwise organized. The taxonomy analysis in block 234 may be used to further group the keywords together, identify synonyms and antonyms for keywords, and other functions.

Embodiment 200 illustrates an example where the additional keyword and metadata extraction may be performed dynamically. The additional keyword and metadata extraction and analysis may be performed while a user may be browsing a listing of results. While the user is browsing, the additional keywords and metadata may be added to the user interface as the additional keywords and metadata are uncovered.

Figure 3:
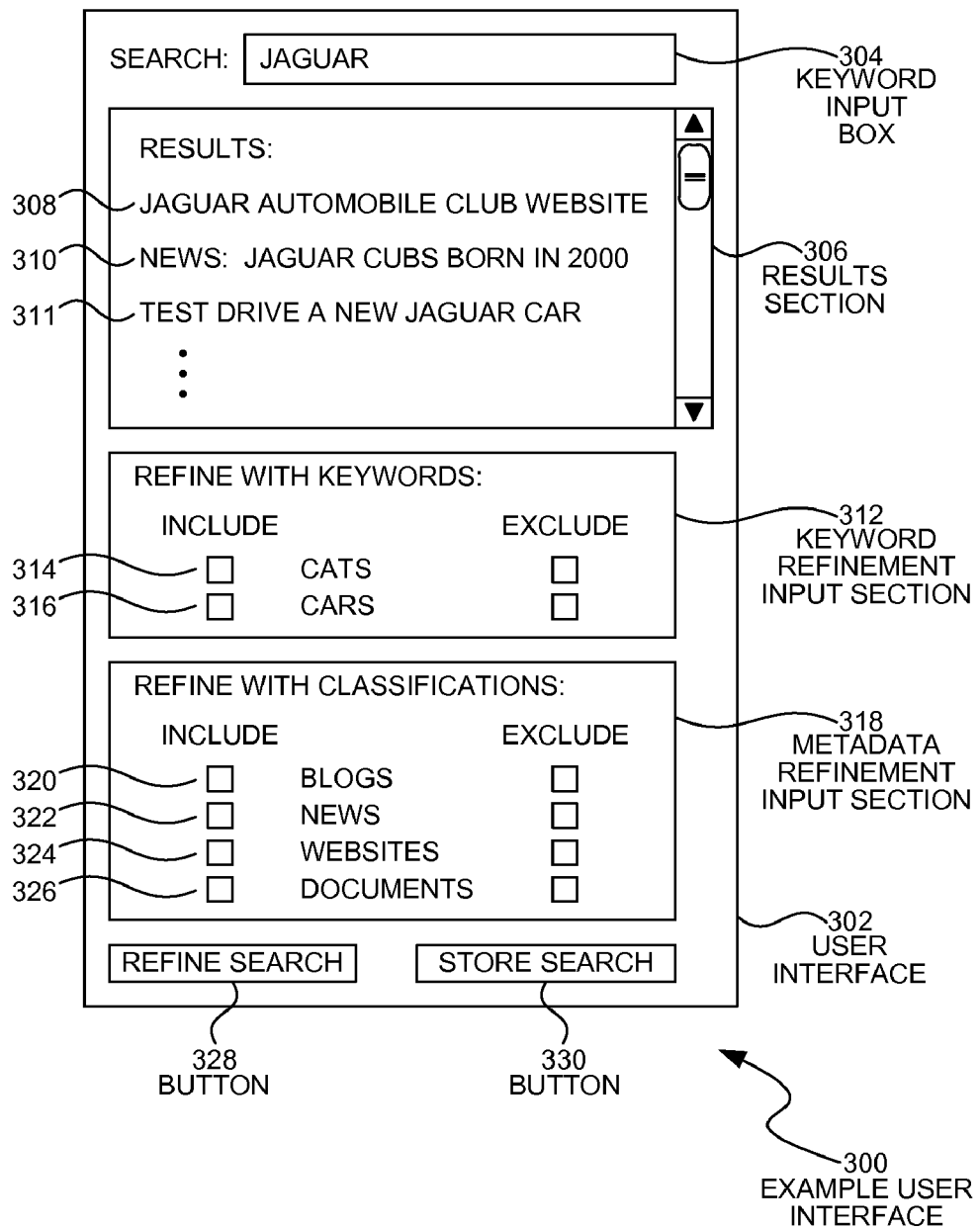
FIG. 3 is a diagram illustration of an embodiment showing an example user interface for a stateful search session.

FIG. 3 is a diagram illustration of an example embodiment 300 showing a user interface for a stateful search session system. Embodiment 300 is a simplified user interface that may be displayed on a user's client device for performing a search.

The user interface 302 of embodiment 300 illustrates a simple user interface through which a user may enter keywords, review search results, and refine the search results using additional keywords or various metadata classifications.

In the input text box 304, a user may type a keyword or set of keywords. In the example of embodiment 300, the user's initial keyword is "Jaguar".

The current results of the search are presented in a results section 306. The results may contain results 308, which may be a link to a Jaguar automobile club website, results 310 which may be a link to a news items about jaguar cubs being born in the local zoo, and results 311 which may be link to a website for test driving a new Jaguar car.

From the example, the results for "Jaguar" may be divided into two large categories: the results dealing with an automobile named "Jaguar" and the large feline. Because these groups of results may be very distinct from each other, the user may wish to explore one of the groups but not the other.

A keyword refinement input section 312 may be presented in the user interface. In the keyword refinement input section 312, the keywords of "cats" 314 and "cars" 316 are presented. The user may be able to include or exclude results for each keyword. If the user was interested in results about the jaguar animal, the user may be able to select the include box for "cats". The user may or may not also click the exclude button for "cats" as well.

The effects of selecting the exclude button may be different in various embodiments. In some embodiments, the exclude button may remove results having the same keyword. In other embodiments, the results having the keyword may be ranked much lower in the results section.

A metadata refinement input section 318 may also be presented to the user. In the case of embodiment 300, the metadata input section may present various classifications of document types, such as blogs 320, news 322, websites 324, and documents 326. The metadata input section may allow the user to further refine the search based on classifications of items in the current set of results.

Once the user has made various selections to the keywords or metadata sections, the user may activate the button 328 to refine the search. In some embodiments, the refined search may update the results section 308 quickly and then update the keyword and metadata input sections after some delay.

When the user refines the search, the results section 306 may use animation or other visual indicators to show changes to the results section. For example, if the user were to select to exclude "cats" in the keyword section and include "cars", the results section may be animated to show the results 310 disappearing and results 311 move upwards to fill the place occupied by results 310. Such an animation may give the user a sense of the search session and help the user identify the changes to the search results.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed by a computer processor for refining a search, said method comprising:

receiving a first search query comprising a first set of keywords;

causing a first search to be performed using said first search query on a first search engine;

receiving a first set of search results from said first search engine in response to said first search query;

causing at least a portion of said first set of search results to be presented on a computer display;

analyzing content contained in said first set of search results to derive a first set of related keywords related to the first set of keywords, the first set of related keywords for categorizing portions of the first set of search results into different categories;

causing at least a portion of said first set of related keywords to be presented on said computer display, said related keywords being presented to indicate how the first search results are divided into different categories such that a user may select related keywords to refine the first search within specified categories from among the different categories;

receiving at least one of said related keywords selected by said user, said at least one related keyword corresponding to one or more categories from among the different categories;

refining the first search query based on said selected at least one of said related keywords to create a second search query;

causing a second search to be performed using said second search query;

receiving a second set of search results in response to said second search query, the second set of search results including content from the first set of search results refined into the one or more categories;

causing at least a portion of said second set of search results to be presented on said computer display;

determining a second set of related keywords; and causing at least a portion of said second set of related keywords to be presented on said computer display, said related keywords being presented such that a user may select at least one of said related keywords.

2. The method of claim 1, said first search engine being a stateless search engine.

3. The method of claim 1, further comprising referring to a keyword taxonomy to supplement said analyzing content contained in said first set of search results.

4. The method of claim 1, said analyzing said content contained in said first set of search results comprises:

for at least a portion of said first set of search results, analyzing a summary of said search results to extract summary keywords; and analyzing said summary keywords to determine said related keywords.

5. The method of claim 1, said analyzing content contained in said said first set of search results comprises:

for at least a portion of said first set of search results, retrieving said search results to extract summary keywords; and analyzing said summary keywords to determine said related keywords.

6. The method of claim 1, said first set of search results and said second set of search results comprising web pages.

7. The method of claim 1 further comprising:

determining a first set of metadata associated with said first set of search results, said first set of metadata comprising classifications for at least some of said first set of search results;

causing at least two of said classifications to be presented on said computer display;
receiving one of said classifications selected by said user; and
creating a second search query further comprising said one of said classifications.

8. The method of claim 1 further comprising:
causing a third search to be performed using said first search query on a second search engine;
receiving a third set of search results from said second search engine in response to said first search query; and
causing at least a portion of said third set of search results to be presented on said computer display.

9. A system comprising:
a computer processor;
a connection to a computer display;
a stateful search session system that:
receives a first search query comprising a first set of keywords;
causes a first search to be performed using said first search query on a first search engine;
receives a first set of search results from said first search engine in response to said first search query;
causes at least a portion of said first set of search results to be presented on a computer display;
analyze content contained in said first set of search results to derive a first set of related keywords related to the first set of keywords, the first of set of related keywords for categorizing portions of the first set of search results into different categories;
causes at least a portion of said first set of related keywords to be presented on said computer display, said related keywords being presented to indicate how the first search results are divided into different categories such that a user may select related keywords to refine a search within specified categories from among the different categories;
receives at least one of said related keywords selected by said user, said at least one related keyword corresponding to one or more categories from among the different categories;
refine the first search query based on said selected at least one of said related keyword to create a second search query;
causes a second search to be performed using said second search query;
receives a second set of search results in response to said second search query;
causes at least a portion of said second set of search results to be presented on said computer display;
determines a second set of related keywords; and
causes at least a portion of said second set of related keywords to be presented on said computer display, said related keywords being presented such that a user may select at least one of said related keywords.

10. The system of claim 9, said computer display being on a client device connected to said system through a network connection.

11. The system of claim 10, said client device executing a web browser and said first set of search results being presented using said web browser.

12. The system of claim 11, further comprising said first search engine, said first search engine being a stateless search engine.

13. The system of claim 10, said connection to said computer display being a local connection.

14. The system of claim 13, said stateful search session system being comprised in an application executing on said system.

15. The system of claim 13, said stateful search session system being comprised in executable code executing within a web browser.

16. The system of claim 9 further comprising:
a connection to a predefined keyword taxonomy, said related keywords being determined from said predefined keyword taxonomy.

17. The system of claim 9, said first search engine being a local search engine.

18. A computer program product for use at a computer system, the computer program product for implementing a method for refining a search, the computer program product comprising one or more computer storage medium having stored thereon computer executable instructions that, when executed at a processor, cause the computer system to perform the method, including the following:
receiving a first search query comprising a first set of keywords;
causing a first search to be performed using said first search query on a first search engine;
receiving a first set of search results from said first search engine in response to said first search query;
causing at least a portion of said first set of search results to be presented on a computer display;
analyzing content contained in the said first set of search results along with a first set of metadata to derive a first set of related keywords related to the first set of keywords, the first set of related keywords for categorizing portions of the first set of search results into different categories;
causing at least a portion of said first set of related keywords and said at least two classifications to be presented on said computer display, said related keywords being presented to indicate how the first search results are divided into different categories such that a user may select related keywords to refine the first search within specified categories from among the different categories;
receiving at least one of said related keywords selected by said user, said at least one related keyword corresponding to one or more categories from among the different categories;
refining the first search query based on said at least one of said related keywords to create a second search query;
causing a second search to be performed using said second search query;
receiving a second set of search results in response to said second search query, the second set of search results including content from the first set of search results refined into the one or more categories;
causing at least a portion of said second set of search results to be presented on said computer display;
determining a second set of related keywords; and
causing at least a portion of said second set of related keywords to be presented on said computer display, said related keywords being presented such that a user may select at least one of said related keywords.

19. The computer readable medium of claim 18, said first search engine comprising a web search engine.

20. The computer readable medium of claim 19, said first search engine comprising a local search engine.

* * * * *

UNITED STATES PATENT AND TRADEMARK OFFICE
CERTIFICATE OF CORRECTION

PATENT NO. : 8,332,393 B2  
APPLICATION NO. : 12/907193  
DATED : December 11, 2012  
INVENTOR(S) : Oded Elyada Page 1 of 1

It is certified that error appears in the above-identified patent and that said Letters Patent is hereby corrected as shown below:

In the Claims

Column 10, line 55, In Claim 5, before "first" delete "said".

Signed and Sealed this  
Tenth Day of February, 2015

Michelle K. Lee  
*Deputy Director of the United States Patent and Trademark Office*